US 6,600,907 B1

(12) United States Patent
Taguchi

(10) Patent No.: US 6,600,907 B1
(45) Date of Patent: Jul. 29, 2003

(54) WIRELESS COMMUNICATION APPARATUS AND POWER CONSUMPTION REDUCING METHOD THEREOF

(75) Inventor: Motoyasu Taguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/431,275

(22) Filed: Nov. 1, 1999

(30) Foreign Application Priority Data

Nov. 2, 1998 (JP) .......................................... 10-311867

(51) Int. Cl.[7] ................................................ H04B 7/08
(52) U.S. Cl. ...................................... 455/132; 375/345
(58) Field of Search ................................ 455/132, 133, 455/134, 137, 506, 125, 343, 574; 375/345

(56) References Cited

U.S. PATENT DOCUMENTS

| | | | | |
|---|---|---|---|---|
| 4,112,497 A | * | 9/1978 | Fletcher et al. ............. | 708/422 |
| 5,291,519 A | | 3/1994 | Tsurumaru | |
| 5,541,963 A | * | 7/1996 | Nakagoshi | |
| 5,559,838 A | | 9/1996 | Nakagoshi | |
| 5,566,364 A | | 10/1996 | Mizoguchi et al. | |
| 5,691,983 A | * | 11/1997 | Nawata | |
| 5,805,643 A | * | 9/1998 | Seki et al. | |
| 5,933,466 A | * | 8/1999 | Oshima et al. | |
| 6,067,293 A | * | 5/2000 | Shoji | |
| 6,069,913 A | * | 5/2000 | Suominen .................... | 375/147 |
| 6,085,104 A | * | 7/2000 | Kowalski et al. | |
| 6,108,548 A | * | 8/2000 | Furukawa et al. | |
| 6,226,505 B1 | * | 5/2001 | Uda | |
| 6,304,761 B1 | * | 10/2001 | Tsunehiro .................. | 340/7.32 |

FOREIGN PATENT DOCUMENTS

| | | |
|---|---|---|
| EP | 0 500 326 A2 | 2/1992 |
| EP | 0500326 A2 | 8/1992 |
| EP | 0665658 A2 | 8/1995 |
| JP | 4-334212 | 11/1992 |
| JP | 6-284062 | 10/1994 |
| JP | 7-15380 | 1/1995 |
| JP | 7-123037 | 5/1995 |
| JP | 8-65233 | 3/1996 |
| JP | 8-237171 | 9/1996 |
| JP | 9-181660 | 7/1997 |
| JP | 9-200177 | 7/1997 |
| JP | 9-261167 | 10/1997 |
| JP | 10-4383 | 1/1998 |
| JP | 10-135869 | 5/1998 |
| JP | 11-150497 | 6/1999 |

OTHER PUBLICATIONS

British Office Action dated May 22, 2001.
British Search Report dated Apr. 26, 2000.
Japanese Office Action dated Feb. 22, 2000, with partial translation.
Chinese Office Action dated Jun. 7, 2002 with English translation.

* cited by examiner

Primary Examiner—Nguyen T. Vo
Assistant Examiner—Nghi H. Ly
(74) Attorney, Agent, or Firm—McGinn & Gibb, PLLC

(57) ABSTRACT

In a CDMA communication apparatus, two receiving circuits provided in correspondence with the antennas demodulate signals received by the antennas to thereby output reception signals. Two delayprofile circuits provided in correspondence with the receiving circuits shift phases of the reception signals from the receiving circuits every predetermined interval, correlate the reception signals with respect to the known data to thereby output correlation value data. A searcher circuit retrieves peaks from at least two correlation value data derived from the delayprofile circuit and compares the peaks detected from the correlation value data with each other, and substantially stops the operation of at least one of the plural receiving circuits based on the comparison result.

23 Claims, 14 Drawing Sheets

WIRELESS COMMUNICATION APPARATUS AND POWER CONSUMPTION REDUCING METHOD THEREOF

BACKGROUND OF THE INVENTION

1. Field of the Invention

The present invention relates to a wireless communication apparatus and a wireless communicating method. More specifically, the present invention is directed to such a wireless communication apparatus equipped with a power consumption reducing function operable in the code division multiple access (CDMA) system, and also to a method for reducing power consumption of such a CDMA wireless communication apparatus.

2. Description of the Related Art

Generally speaking, wireless communication apparatuses such as a portable telephone and a mobile radio telephone employ batteries, or cells as compact power supplies with light weight. However, this sort of battery owns lifetime, namely continuously operable without recharging. As a consequence, in order to realize long communication time of this sort of wireless communication apparatus, power consumption thereof is necessarily reduced as much as possible.

Japanese Patent Application Laid-open No. Hei 9-200177 discloses one conventional CDMA receiver. Now, this conventional CDMA receiver will be described with reference to FIG. 1. A correlation filter used in the weighting process of the CDMA receiver shown in FIG. 1. This correlation filter is arranged by the delay circuit 100 and the weighting/synthesizing circuit 200. The delay circuit 100 outputs a plurality of tap output signals TP1 to TPn whose delay time is different from each other. This weighting/synthesizing circuit 200 executes the weighting process and synthesizing process operation based upon the outputs of this delay circuit 100, and then sends out the correlation output signal. This correlation output signal derived from the weighting/synthesizing circuit 200 is supplied to the timing control circuit 300. In response to the correlation output signal supplied from the weighting/synthesizing circuit 200, this timing control circuit 300 outputs the control signal so as to control the switch. The supply of the electric power from the power supply 500 to the weighting/synthesizing circuit 200 is ON/OFF-controlled by this switch control operation. That is, only within the section where the correlation peaks are concentrated, the switch element 4 is turned ON so that the supply of the electric power to the weighting/synthesizing circuit 200 is performed. Within such a section where the correlation peaks are not concentrated, no electric power is supplied to this circuit 200. As a result, since the electric power is supplied to the weighting/synthesizing circuit only in the necessary section, the power consumption is reduced.

Japanese Patent Application Laid-open No. Hei 9-261167 also describes the CDMA communication apparatus capable of reducing the power consumption. That is, this conventional CDMA communication apparatus contains the receiving unit operable in high speed for the communication channel, and also the receiving unit operable in low speed for the paging channel. Since the high speed process operation is required in the receiving unit for the communication channel, the resultant power consumption thereof is large. Therefore, in this conventional CDMA communication apparatus, the power supply of the paging channel receiving unit is turned ON during signal reception period, and the power supply of the communication channel receiving unit is turned OFF, so that the power consumption is reduced.

Referring now to FIG. 2, this CDMA communication apparatus will be explained. As indicated in FIG. 2, the control unit 134 is provided with the mobile telephone. This control unit 134 ON/OFF-controls supplying of the electric power to the A/D converter 125, the reception filter 126, the correlator 127, and the spread code generating circuit 128 during the signal reception period. As a consequence, power consumption of the battery can be reduced during the signal reception period which is long.

On the other hand, in a wireless communication system such as a mobile communication apparatus, there are some possibilities that this communication apparatus employs a plurality of signal reception systems such as antennas and receiving circuits in order to avoid bad reception condition by the fading phenomenon. However, when a large number of antenna systems are employed, portability of this communication apparatus is deteriorated. Therefore, while only two signal reception systems are employed, such a reception system having a high reception level is generally selected to receive a signal. Such system is typically known as the antenna diversity technique.

However, since two signal reception systems are employed in one mobile communication apparatus and are simultaneously operated, this may cause the power consumption to be increased. Therefore, the power consumption is desirably reduced. However, the conventional communication apparatuses as described in the above-mentioned Japanese Patent Application Laid-open Nos. Hei 9-200177 and Hei 9-261167 have no effective power consumption reducing ideas.

SUMMARY OF THE INVENTION

An object of the present invention is to provide a wireless communication apparatus, and also a power consumption reducing method thereof, capable of effectively reducing power consumption.

Also, another object of the present invention is to provide a wireless communication apparatus, and also a power consumption reducing method thereof, in which at least two signal reception systems are provided and power consumption thereof can be effectively reduced.

To achieve the above-described objects of the present invention, a wireless communication apparatus of the present invention comprises a plurality of receivers for receiving signals to output reception signals and controller for substantially stopping operation of at least one of the plural receivers based upon the reception signals received by said receivers.

Also, to achieve the above-described objects of the present invention, a power consumption reducing method of a wireless communication apparatus comprises the steps of receiving signals at a plurality of reception systems to output a plurality of reception signals; and substantially stopping operation of at least one of the plural reception systems based upon the plurality of reception signals.

To achieve the above-described objects of the present invention, a CDMA communication apparatus comprises at least two antennas, at least two receiving circuits provided in correspondence with the antennas for demodulating signals received by said antennas to thereby output reception signals, at least two delayprofile circuits provided in correspondence with the receiving circuits for correlating said reception signals with respect to a predetermined data to thereby output correlation value data and a searcher circuit for detecting peaks from at least two correlation value data derived from the delayprofile circuits, wherein the searcher circuit includes first stopping means for comparing the peaks detected from the correlation value data with each other to obtain a comparison result and for substantially stopping operation of at least one of the plural receiving circuits based on the comparison result.

To achieve the above-described objects of the present invention, a power consumption reducing method of a CDMA communication apparatus comprises the steps of demodulating signals received by at least two antennas to thereby output reception signals, shifting phases of the reception signals every predetermined interval and then correlating the reception signals with respect to a predetermined data to thereby output correlation value data, detecting peaks from at least two correlation value data, comparing the peaks detected from at least the two correlation value data with each other to obtain a comparison result, and substantially stopping processing the signal received by at least one of said antennas based on the comparison result.

To achieve the above-described objects of the present invention, a CDMA receiving apparatus, comprises two reception systems for receiving signals, demodulating the received signals, and correlating the demodulated reception signals with respect to a predetermined data to thereby output a correlation value, and a control unit for substantially stopping operation of at least one of the plural reception systems based upon the correlation values outputted from the respective reception systems.

BRIEF DESCRIPTION OF THE DRAWINGS

These and other objects, features and advantages of this invention will become more fully apparent from the following detailed description taken with the accompanying drawings in which.

DESCRIPTION OF THE PREFERRED EMBODIMENTS

Figure 1:
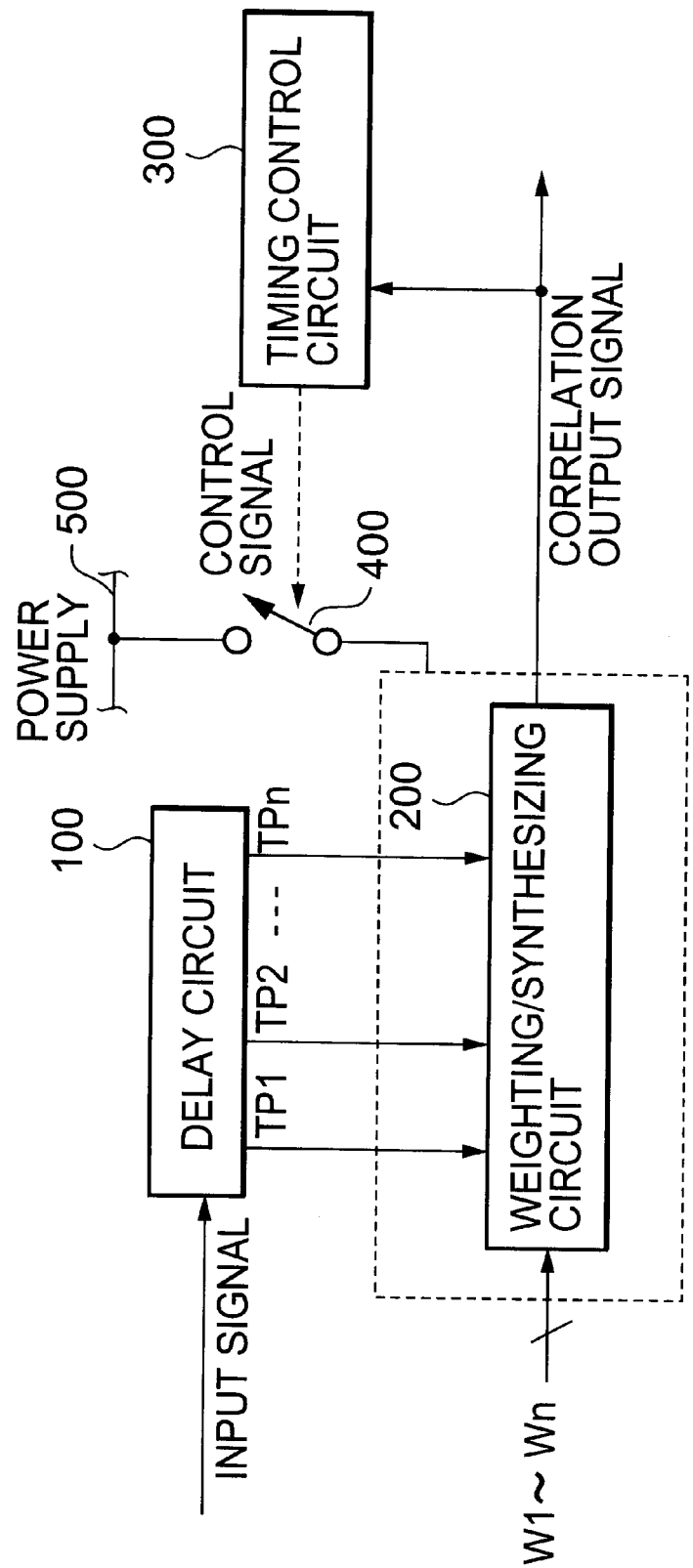
FIG. 1 is a schematic block diagram for showing the power consumption reducing circuit employed in the conventional CDMA receiver.
Figure 2:
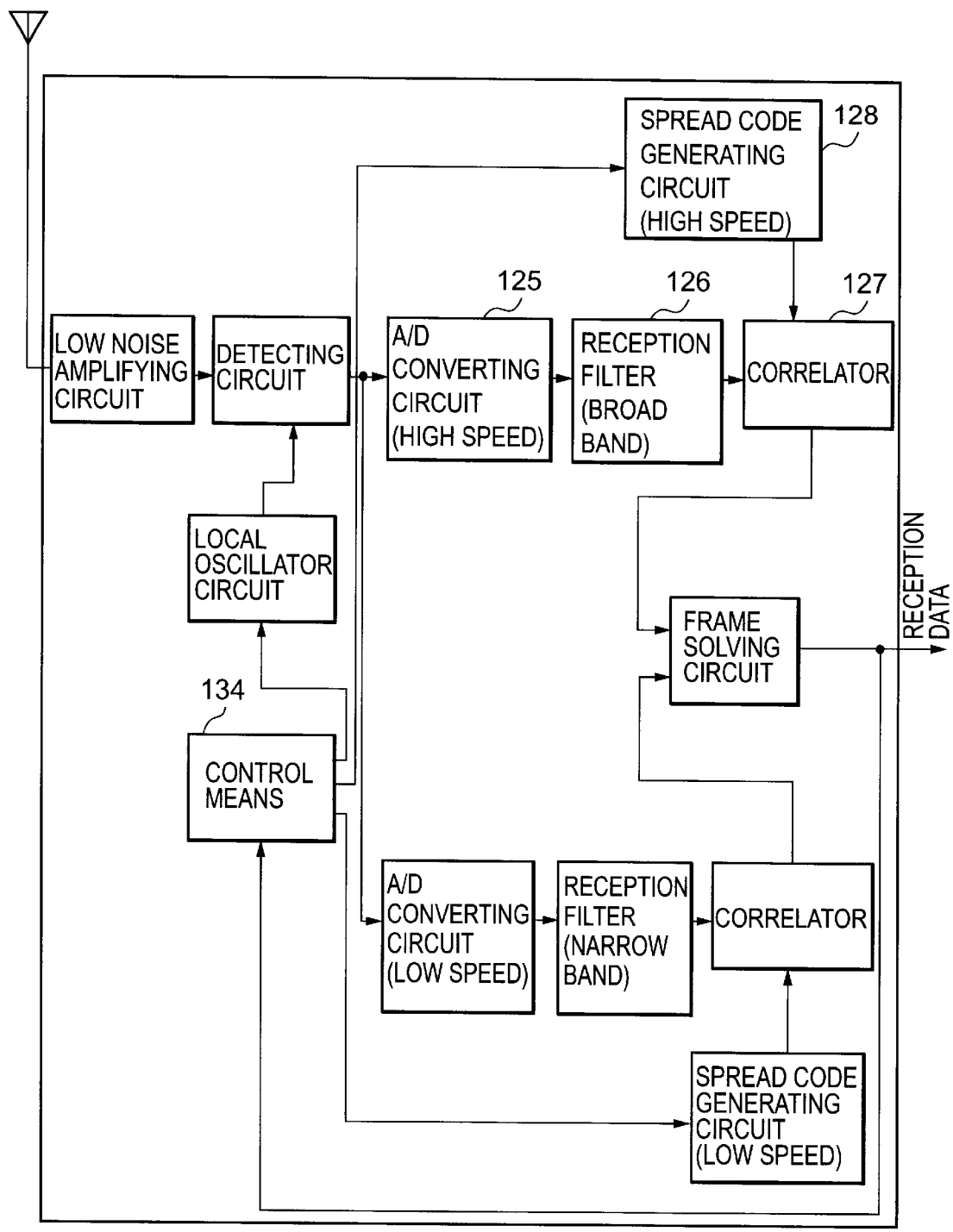
FIG. 2 is a schematic block diagram for indicating the power consumption reducing circuit provided in another conventional CDMA communication apparatus.

Referring now to the drawings, preferred embodiments of the present invention will be described.

Figure 3:
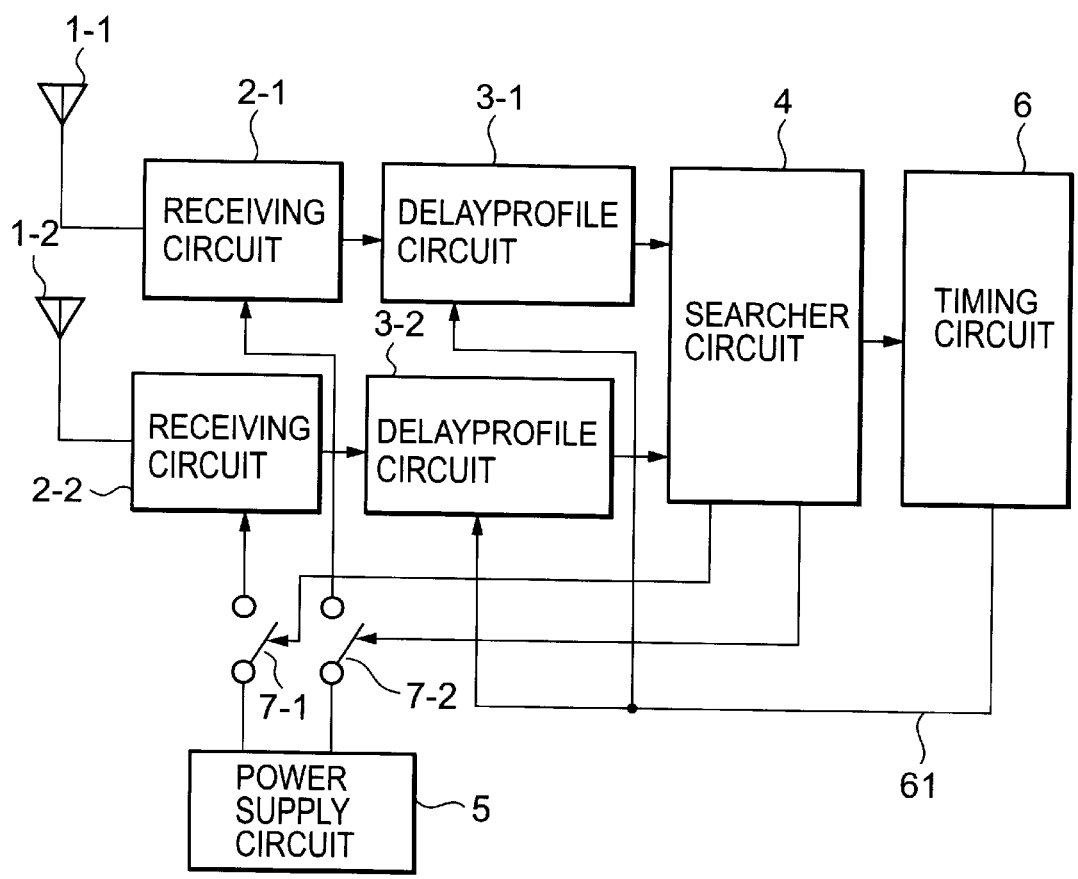
FIG. 3 is a schematic block diagram for representing an arrangement of a wireless communication apparatus according to an embodiment of the present invention.

One preferred embodiment of the present invention will now be explained with reference to FIG. 3. In FIG. 3, a wireless (radio) communication apparatus according to this embodiment, preferably a mobile communication apparatus such as a portable telephone, is provided with: antennas 1-1 and 1-2; receiving circuits 2-1 and 2-2; delayprofile circuits 3-1 and 3-2; a searcher circuit 4; a power supply circuit 5; a timing circuit 6; and switches 7-1 and 7-2. These receiving circuits 2-1/2-2 and delayprofile circuits 3-1/3-2 are respectively employed in correspondence with these antennas 1-1/1-2.

The receiving circuits 2-1 and 2-2 demodulate signals received by the corresponding antennas 1-1 and 1-2. The delayprofile circuits 3-1 and 3-2 shift phases every predetermined interval with respect to the respective signals demodulated by these receiving circuits 2-1 and 2-2, and then acquire correlation between these phase-shifted signals and a predetermined data, namely a predetermined spread code to thereby output correlation value data. Here, the correlation value data is a data showing a correlation level between the reception signal and a predetermined spread code. The search circuit 4 retrieves a peak value of these correlation values with respect to the correlative values outputted from the delayprofile circuits 3-1 and 3-2, and furthermore outputs a timing adjusting value based on such timing at which the peak value is retrieved. In this embodiment, the reason why two sets of antennas 1-1 and 1-2 are provided is given as follows. The antenna capable of receiving the signal under better reception condition is selectively used, while considering the adverse influences caused by the interference waves such as the fading phenomenon. It should be noted that one of these two antennas 1-1 and 1-2 may be provided outside a housing of this wireless communication apparatus, and the other antenna may be provided inside the housing of this wireless communication apparatus.

Also, the timing circuit 6 notifies frame starting timing to the delayprofile circuits 3-1 and 3-2 in the form of a timing signal 61 in response to the timing adjusting value outputted from the searcher circuit 4. The power supply circuit 5 supplies electric power to both the receiving circuits 1-1 and 1-2. The switches 7-1 and 7-2 stops the supply of the electric power to such a receiving circuit of a signal reception system whose correlation value is small in the case that a difference between a peak value of correlation value data outputted from the delayprofile circuit 3-1 and a peak value of correlation value data outputted from the delayprofile circuit 3-2 will exceed a predetermined threshold value. It should be understood that a peak value of correlation value data may also be simply referred to as a "correlation value" in this specification. Also, the power supply circuit 5 is realized by a battery.

Both the receiving circuits 2-1 and 2-2 demodulate the reception signals which have been spread by way of the predetermined spread codes entered from the antennas 1-1 and 1-2, respectively. Next, the delayprofile circuits 3-1 and 3-2 shift the phases with respect to the I signal and the Q signal, which are demodulated by the receiving circuits 2-1 and 2-2, and then acquire correlation between the phase-shifted signals and a predetermined spread code. Then, the respective correlation value data D1, D2, D3, . . . , Dn are supplied from these delayprofile circuits 3-1/3-2 to the searcher circuit 4.

Figure 4:
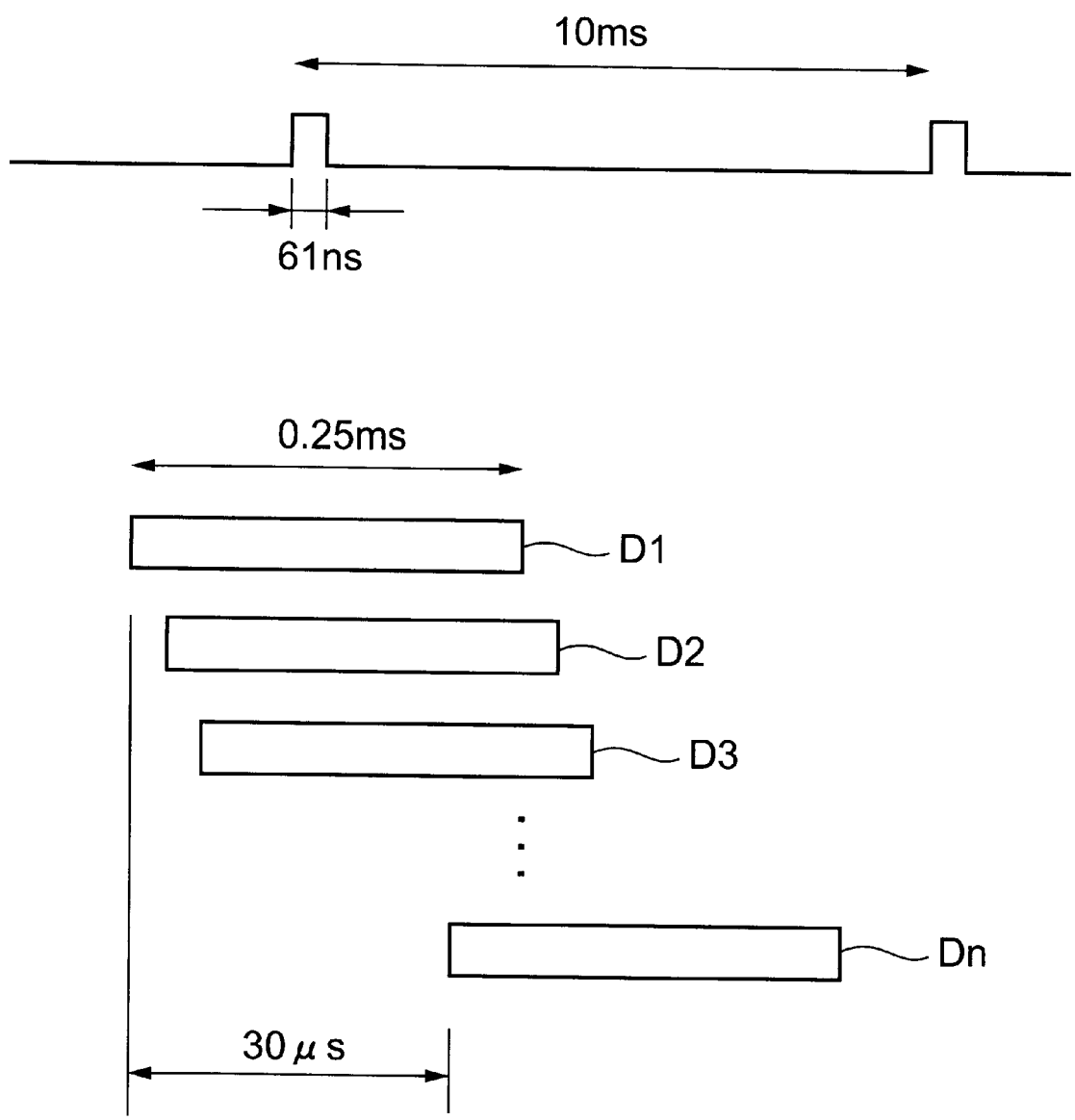
FIG. 4 indicates a timing chart for explaining operations of a delayprofile circuit shown in FIG. 3.

At this time, for instance, as shown in FIG. 4, the delayprofile circuits 3-1 and 3-2 shift the phases within a range of +15 μs and −15 μs and then send out the respective correlation value data. In this range, a frame starting position of a time period of 10 ms is set as a center. In other words, rise timing of a pulse having a pulse width 61 ns is set as a center. As a result, the delivering timing of the correlation value data outputted from the delayprofile circuit 3-1 is different from the delivering timing of the correlation value data outputted from the delayprofile circuit 3-2.

As to the pulse width, since the wireless communication apparatus may be easily manufactured when this pulse width is set based upon such a value defined by multiplying a reference frequency of 16.384 MHz by an integer, the pulse width of the pulse indicative of the frame starting position is set to 61 ns. In other words, 61 ns equal to 1/16.384 MHz is selected as the pulse width. It should also be noted that a length of each data is equal to 0.25 ms.

Considering the trade off in the circuit design, while the phases are shifted within the range of +15 μs and −15 μs, the correlation value data are sent out. In other words, when the phase shift is set to a value larger than this range, the circuit scale of the delayprofile circuit is increased and therefore, the power consumption thereof is increased. Conversely, when the phase shift is set to a value smaller than this range, proper correlation value data cannot be selected.

Figure 5:
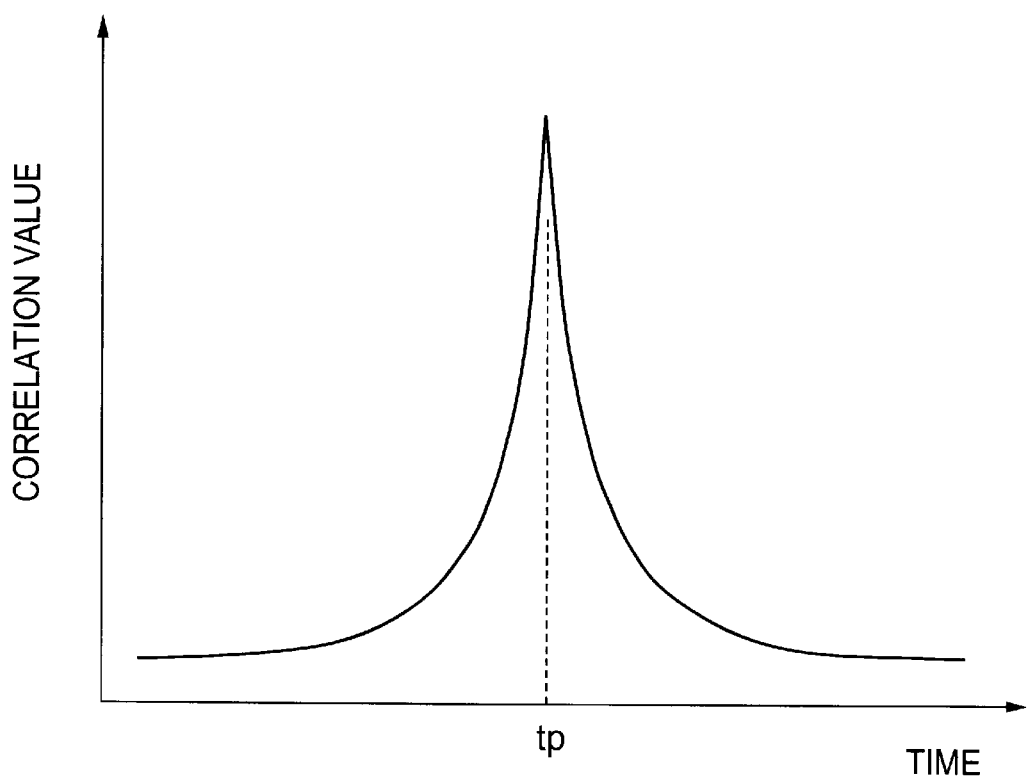
FIG. 5 is a diagram for representing a relationship between a correlation value and data sending timing.

Next, the searcher circuit 4 retrieves more than one peak value from the correlation value data respectively derived from the delayprofile circuits 3-1 and 3-2. In this case, as shown in FIG. 5, when the delayprofile circuits 3-1/3-2 acquire a correlation between correlation value data and a predetermined data every delivering timing of each of the correlation value data, a correlation value has a peak at a time instant "tp". The searcher circuit 4 retrieves such a peak value among the correlation value data D1, D2, D3, . . . , Dn derived from the delayprofile circuits 3-1 and 3-2, respectively.

Furthermore, the searcher circuit 4 compares the peak value of the correlation value data outputted from the delayprofile circuit 3-1 with the peak value of the correlation value data outputted from the delayprofile circuit 3-2, and calculates a difference between both the peak values. The electric power consumption required in this peak value comparison is very small, as compared with the electric power consumed in the respective receiving circuits 2-1 and 2-2. The searcher circuit 4 controls both the switches 7-1 and 7-2 based on the calculated difference.

A threshold value is previously set to this searcher circuit 4. In such a case that the difference between the peak values of the correlation value data of the two signal reception systems exceeds this predetermined threshold value, the searcher circuit 4 controls both the switches 7-1 and 7-2 in such a manner that the supply of the electric power from the power supply circuit 5 to such a receiving circuit of the signal reception system which owns the smaller peak value, namely smaller correlation value, is brought into the OFF state. Conversely, when the difference between the peak values of the two signal reception systems does not exceed this threshold value, the supply of the electric power from the power supply circuit 5 to both the receiving circuits 2-1 and 2-2 is continued.

In this case, as this threshold value, for example, such a relative value of 6 dB (=20 log (¼)), namely one peak value being equal to ¼ of the other peak value is set. Then, in such a case that the difference between the peak values of the correlation value data of the two signal reception systems exceeds 6 dB, the searcher circuit 4 controls such that the supply of the electric power to such a receiving circuit of the signal reception system which owns the smaller correlation value is stopped. Conversely, when the difference between the peak values of the two signal systems does not exceed 6 dB, the supply of the electric power from the power supply circuit 5 to both the receiving circuits is continued. It should be understood that when the difference between the peak values of the correlation value data of the two signal reception systems is equal to 6 dB, the electric power required for the receiving circuit where the peak value is small becomes only ¼ of the electric power required for the receiving circuit where the peak value is large. As a consequence, even when the supply of the electric power to the receiving circuit where the peak value is small is stopped, there is no serious influence.

As previously explained, in such a case that the difference between the peak values of the correlation value data of the two signal reception systems, namely the difference between the correlation values exceeds a predetermined threshold value, since the supply of the electric power to the circuit for receiving the signal having the low correlation value is interrupted, the power consumption can be suppressed to a low value. In this case, since the judgment for interrupting the power supply is carried out by the searcher circuit 4 employed in the general-purpose CDMA receiving apparatus, no specific hardware needs be prepared.

Figure 6:
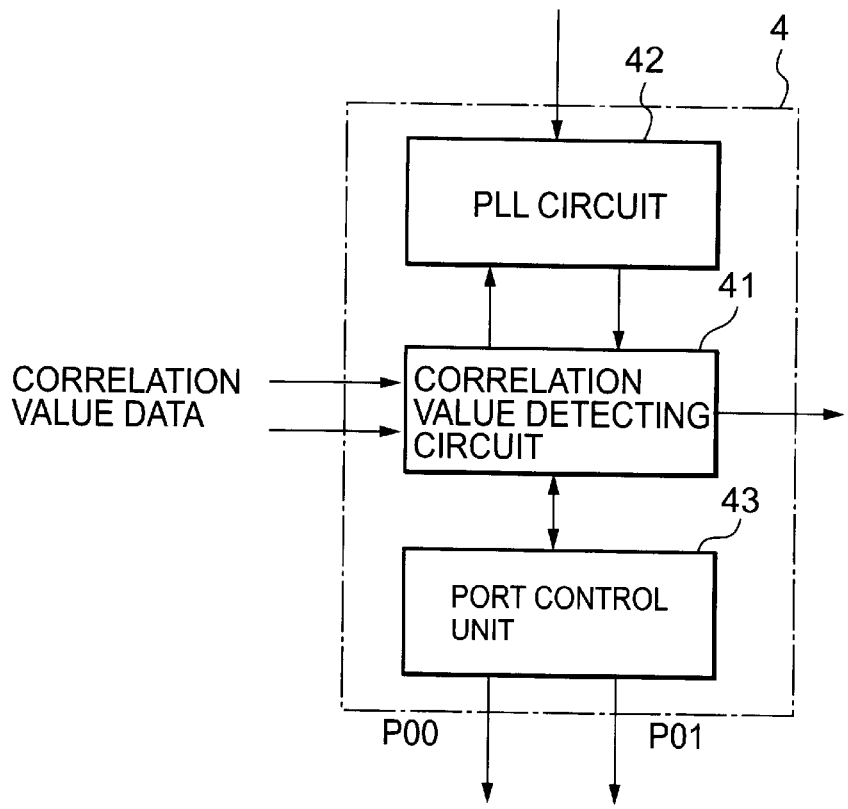
FIG. 6 is a schematic block diagram for showing a circuit arrangement of a searcher circuit indicated in FIG. 3.

Now, a circuit arrangement of the searcher circuit 4 is explained with reference to FIG. 6. As indicated in FIG. 6, the searcher circuit 4 is equipped with a correlation value detecting circuit 41 and a phase lock loop (PLL) circuit 42. The correlation value detecting circuit 41 compares peak values with each other as to two sets of entered correlation value data. The PLL circuit 42 supplies an operation clock to this correlation value detecting circuit 41. This searcher circuit 4 is further constructed of a port control unit 43 controlled by the correlation value detecting circuit 41. The port control unit 43 sends out from ports PO0 and PO1, control signals used to ON/OFF-control the switches 7-1 and 7-2, which may control the supply of the electric power to the two receiving circuits 2-1 and 2-2, respectively. It should be noted that the searcher circuit 4 may be realized by the well-known digital signal processor (DSP).

Figure 7:
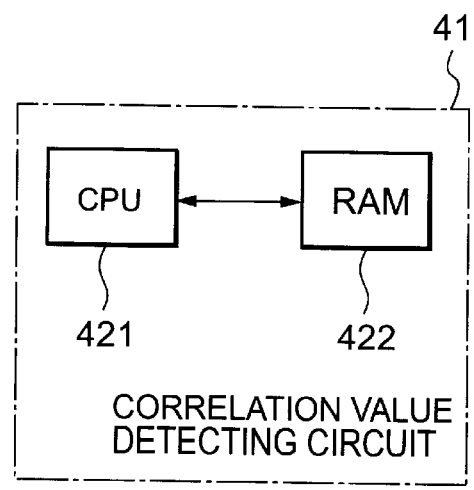
FIG. 7 is a schematic block diagram for indicating a circuit arrangement of a correlation value detecting circuit shown in FIG. 6.

As indicated in FIG. 7, the correlation value detecting circuit 41 contains a central processing unit (CPU) 421 and a random access memory (RAM) 422 for storing thereinto a retrieve process program and a comparison process program. The CPU 421 executes the retrieve process and the comparison process for the peak values as to the correlation value data. Then, since the retrieve process program and the comparison process program stored in the RAM 422 are executed by the CPU 421, the retrieve process and the comparison process of the peak values as to the correlation value data are carried out.

Figure 8:
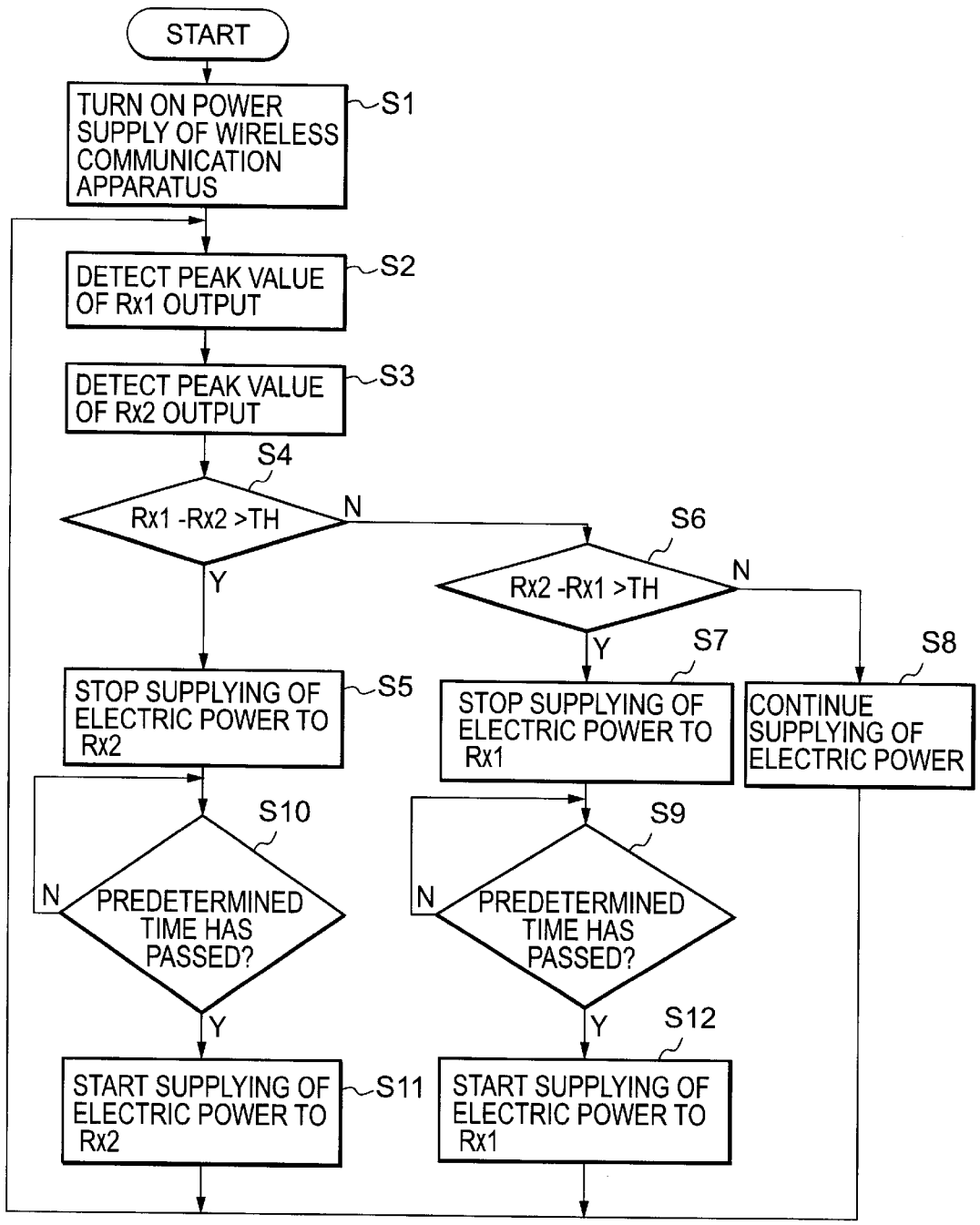
FIG. 8 is a flow chart for describing operations of the correlation value detecting circuit.

Referring now to a flow chart shown in FIG. 8, operations of the correlation value detecting circuit 41 will be described. In FIG. 8, first, in response to ON-operation of supplying of the electric power to the wireless communication apparatus (step S1), a detection is made of a peak value of correlation value data (step S2). The correlation value data are acquired by executing the correlation process with respect to a reception signal outputted from the receiving circuit 2-1 (Rx1). Similarly, a detection is made of another peak value of correlation value data which is acquired by executing the correlation process with respect to another reception signal outputted from the receiving circuit 2-2 (Rx2) (step S3).

Next, the CPU 421 judges as to whether or not a subtraction result, namely a difference between the peak values of the correlation values acquired from the two signal reception systems is larger than a threshold value "TH" (step S4). This subtraction result is obtained by subtracting the peak value of the correlation value data obtained from the signal output of the receiving circuit 2-2 from the peak value of the correlation value data obtained from the signal output of the receiving circuit 2-1. Then, when this subtraction result is larger than the threshold value TH, supplying of the electric power to the receiving circuit 2-2 is stopped (step S5). In other words, the switch 7-2 is brought into the OFF state.

When the subtraction result is smaller than the threshold value TH, at the step S4, the CPU 421 judges as to whether another subtraction result is larger than the threshold value "TH" (step S6). This subtraction result is obtained by subtracting the peak value of the correlation value data obtained from the signal output of the receiving circuit 2-1 from the peak value of the correlation value data obtained from the signal output of the receiving circuit 2-2. Then, when this subtraction result is larger than the threshold value TH, supplying of the electric power to the receiving circuit 2-1 is stopped (step S7). In other words, the switch 7-1 is brought into the OFF state.

In the case that the difference between the peak value of the correlation value data acquired from the output of the receiving circuit 2-1 and the peak value of the correlation value data acquired from the output of the receiving circuit 2-2 is smaller than, or equal to the threshold value "TH", the supply of the electric power is not stopped, but the supply of the electric power to both the receiving circuits 2-1 and 2-2 is continued (steps S4-S6-S8). In other words, both the switches 7-1 and 7-2 remain under ON states.

After stopping the supply of the electric power to the receiving circuit 2-2 at the step S5, when predetermined time of period has elapsed (step S10), the switch 7-2 is turned ON in order to again supply the electric power to the receiving circuit 2-2 (step S11). In response to this restarting operation of the supply of electric power, a similar operation to the above-described operation is repeated (steps S2–S3 . . . ).

After stopping the supply of the electric power to the receiving circuit 2-1 at the step S7, when predetermined time of period has elapsed (step S9), the switch 7-1 is turned ON in order to again supply the electric power to the receiving circuit 2-1 (step S12). In response to this restarting operation of the supply of electric power, the process operations defined after the step S2 are repeated (steps S2–S3 . . .).

It should also be noted that at the step S9 and also the step S10, the predetermined time of period defined between stopping of the supply of electric power to the respective receiving circuits 2-1 and 2-2, and restarting of this supply of electric power is selected to be 10×n [ms] (symbol "n" is a positive integer). This predetermined time of period is counted by a timer circuit (not shown). Also, shown in FIG. 4, the respective correlation value data are sent to the searcher circuit 4 in unit of 10 [ms]. In other words, in the delayprofile circuit, the correlation is acquired in a time period of 10 [ms]. As a result, the time of period during which the supply of the electric power to the signal reception system is stopped is preferably set in the unit of 10 [ms].

As previously described, in such a case that the supply of the electric power to the receiving circuit of the signal reception system where the peak value of the correlation value data, namely the correlation value is small is temporarily brought into the OFF state, the comparison process is again carried out as to the correlation value after predetermined time of period has elapsed. After the supply of the electric power to the receiving circuit is returned to the ON state after predetermined time of period has passed, the comparison process is again carried out for the peak values of the correlation value data, and the supply of the electric power is again stopped based on this comparison result. As a consequence, supplying of the electric power to the receiving circuits can be brought into the OFF state in response to a change in the receiving conditions caused by moving the wireless communication apparatus. Therefore, the power consumption can be more effectively reduced.

The control operation such as the peak value comparison of the correlation value data is carried by the searcher circuit 4. In the case that a DSP is employed in this searcher circuit 4, the control operation such as the peak value comparison may be realized by additionally providing several command codes, and the actual operating time of this DSP is slightly extended. As a result, the power consumption required to perform this control operation is considerably smaller than that of the receiving circuits 2-1 and 2-2.

Figure 9:
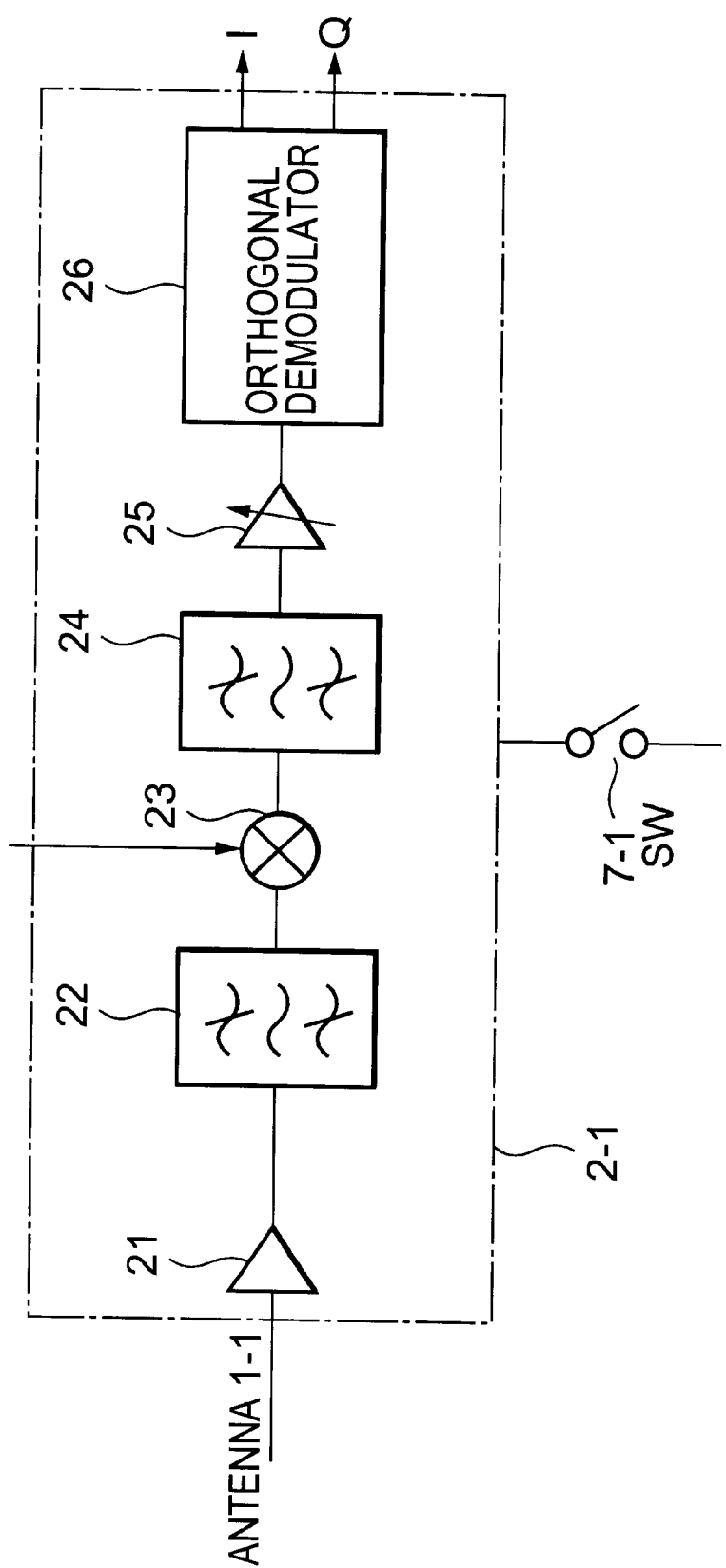
FIG. 9 is a schematic block diagram for representing one structural example of a receiving circuit shown in FIG. 3.

Now, circuit arrangements of the receiving circuits 2-1 and 2-2 shown in FIG. 3 will be described with reference to FIG. 9. Since the circuit arrangement of the receiving circuit 2-1 is substantially identical to that of the receiving circuit 2-2, only the circuit arrangement of the receiving circuit 2-1 is indicated in FIG. 9. As represented in FIG. 9, this receiving circuit 2-1 contains an RF amplifier 21 for amplifying the signal entered from the antenna 1-1, a bandpass filter 22, a mixer 23, another bandpass filter 24, an automatic gain control (AGC) amplifier 25, and also an orthogonal demodulator 26.

Furthermore, a switch 7-1 is provided in this receiving circuit 2-1 so as to control the supply of the electric power thereto. Then, the power consumption of this receiving circuit 2-1 may be reduced by the searcher circuit 4 in such a manner that this switch 7-1 is brought into the OFF state so as to interrupt supplying of the electric power to this receiving circuit 2-1.

Figure 10:
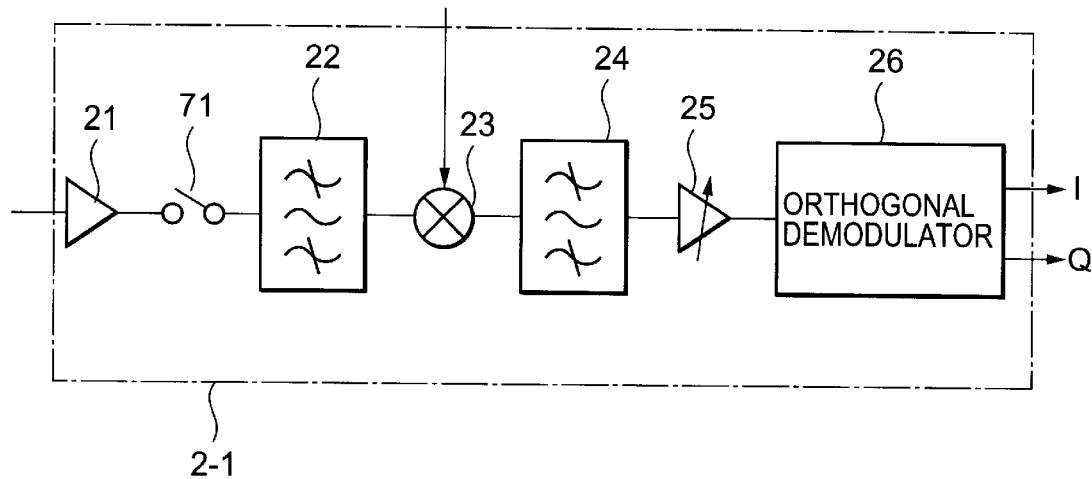
FIG. 10 is a schematic block diagram for showing another structural example of the receiving circuit shown in FIG. 3.

On the other hand, even when the supply of the electric power itself is not brought into the interrupt state, the power consumption of this receiving circuit can be reduced by substantially stopping the operation of the receiving circuit. For instance, as represented in FIG. 10, a switch 71 is provided on the output side of the RF amplifier 21, and then this switch 71 is turned ON/OFF in response to a control signal derived from the searcher circuit 4. In this case, the electric power is supplied to the receiving circuit 2-1. However, the input signal derived from the antenna 1-1 is entered only to the input stage of this receiving circuit 2-1, but is not entered to the circuit arrangement subsequent to this input stage. As a result, the receiving operation of this receiving circuit 2-1 may be substantially stopped. Accordingly, the power consumption can be reduced by substantially stopping the receiving operation of this receiving circuit 2-1.

Figure 11:
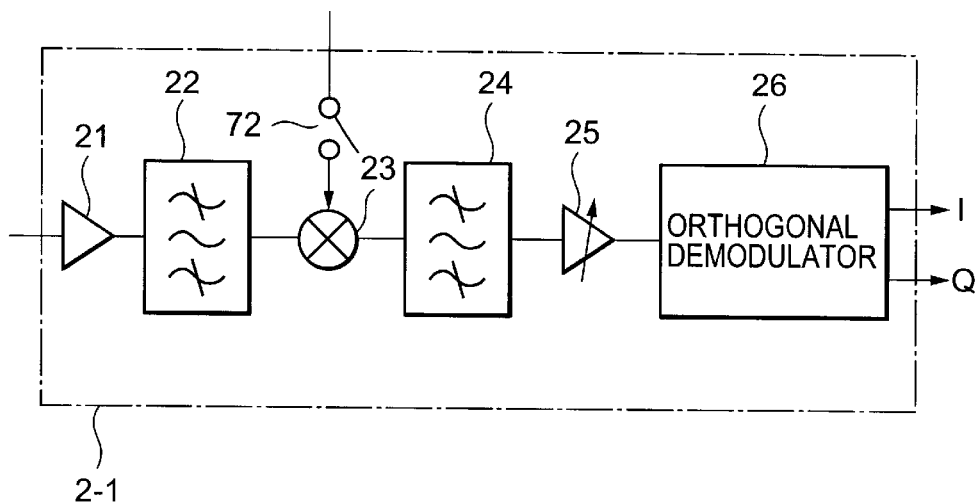
FIG. 11 is a schematic block diagram for indicating a further structural example of a receiving circuit shown in FIG. 3.

Alternatively, as indicated in FIG. 11, another switch 72 is provided on the input side of an oscillating signal produced from a local oscillator (not shown) employed for a mixer 23. The supply of this oscillating signal may be controlled by turning ON/OFF this switch 72 in response to a control signal derived from the searcher circuit 4. In this alternative circuit case, the electric power itself is supplied to the receiving circuit 2-1. However, since the oscillating signal is not entered to the mixer 23, the receiving operation of the receiving circuit 2-1 is substantially stopped. As a result, the power consumption may be reduced by stopping the receiving operation of this receiving circuit 2-1. It should also be noted that the oscillating operation of this local oscillator for producing the oscillating signal may be stopped. In this case, since the receiving operation of this receiving circuit 2-1 is substantially stopped, the power consumption may be similarly reduced.

Figure 12:
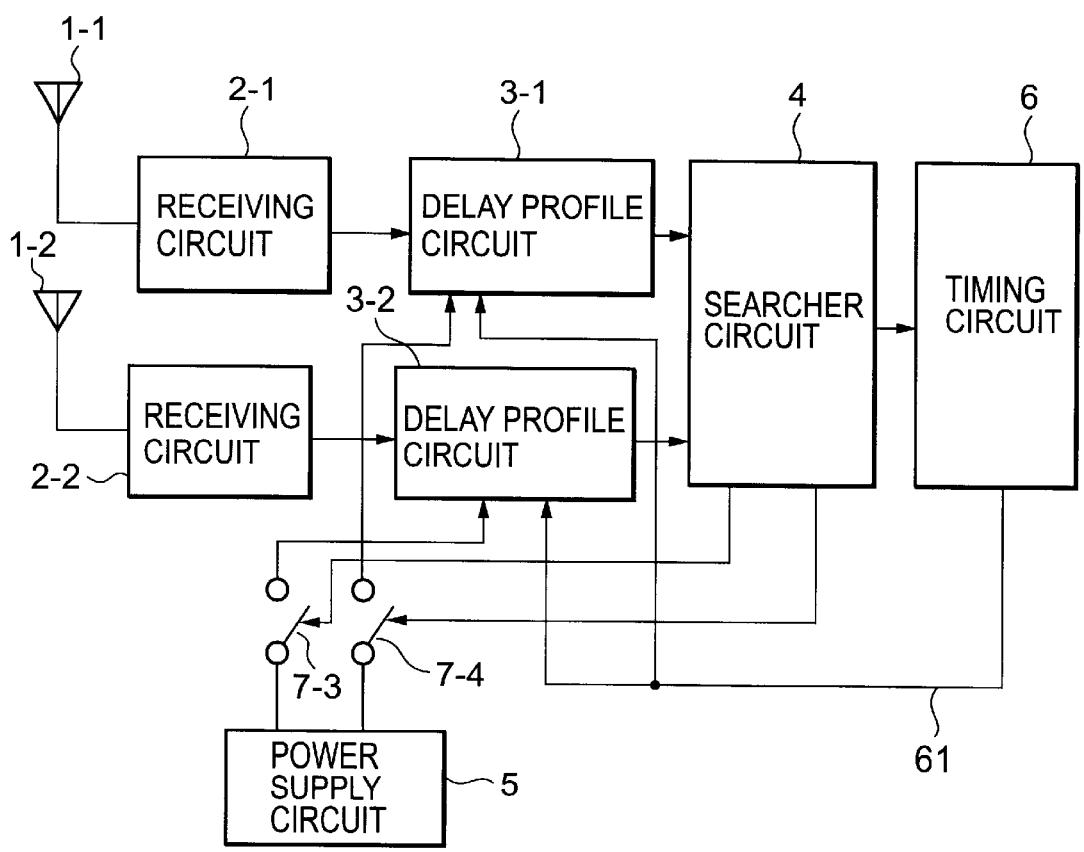
FIG. 12 is a schematic block diagram for indicating an arrangement of a wireless communication apparatus according to another embodiment of the present invention.

The above-explained operations have been described in such a case that supplying of the electric power to a plurality of receiving circuits employed in the wireless communication apparatus is ON/OFF-controlled. Alternatively, the power consumption may be similarly reduced by turning ON/OFF a supply of electric power to the delayprofile circuit. That is, as indicated in FIG. 12, if both a switch 7-3 and a switch 7-4 provided on the output side of the power supply circuit 5 are ON/OFF-controlled based upon control signals supplied from the searcher circuit 4, then the supply of electric power to the delayprofile circuits 3-1 and 3-2 may be controlled. As a result, the supply of the electric power to the delayprofile circuit corresponding to the receiving circuit of the signal reception system having the small correlation value is interrupted, so that the operation of this delayprofile circuit is substantially stopped. As a consequence, the power consumption can be reduced by stopping the operation of this delayprofile circuit.

It should be understood that the circuit arrangements and the operations of the receiving circuits 2-1/2-2, the delayprofile circuits 3-1/3-2, the searcher circuit 4, the power supply circuit 5, and the timing circuit 6 shown in FIG. 12 are similar to those of FIG. 3.

Also, as apparent from the foregoing description, supplying of the electric power to both a receiving circuit and a delayprofile circuit may simultaneously be ON/OFF-controlled. That is, as shown in FIG. 13, when both a switch 7-5 and a switch 7-6 provided on the output side of the power supply circuit 5 are turned ON/OFF by the searcher circuit 4, supplying of electric power to the receiving circuit 2-1 and the delayprofile circuit 3-1, and also the receiving circuit 2-2 and the delayprofile circuit 3-2 may be ON/OFF-controlled.

As a result, supply of the electric power to both the receiving circuit of the signal reception system having the small correlation value and the delayprofile circuit corresponding to this receiving circuit is interrupted, so that the operations of both the receiving circuit and the delayprofile circuit are substantially stopped. Therefore, the power consumption may be reduced by stopping these operations of this receiving circuit and this delayprofile circuit.

Figure 13:
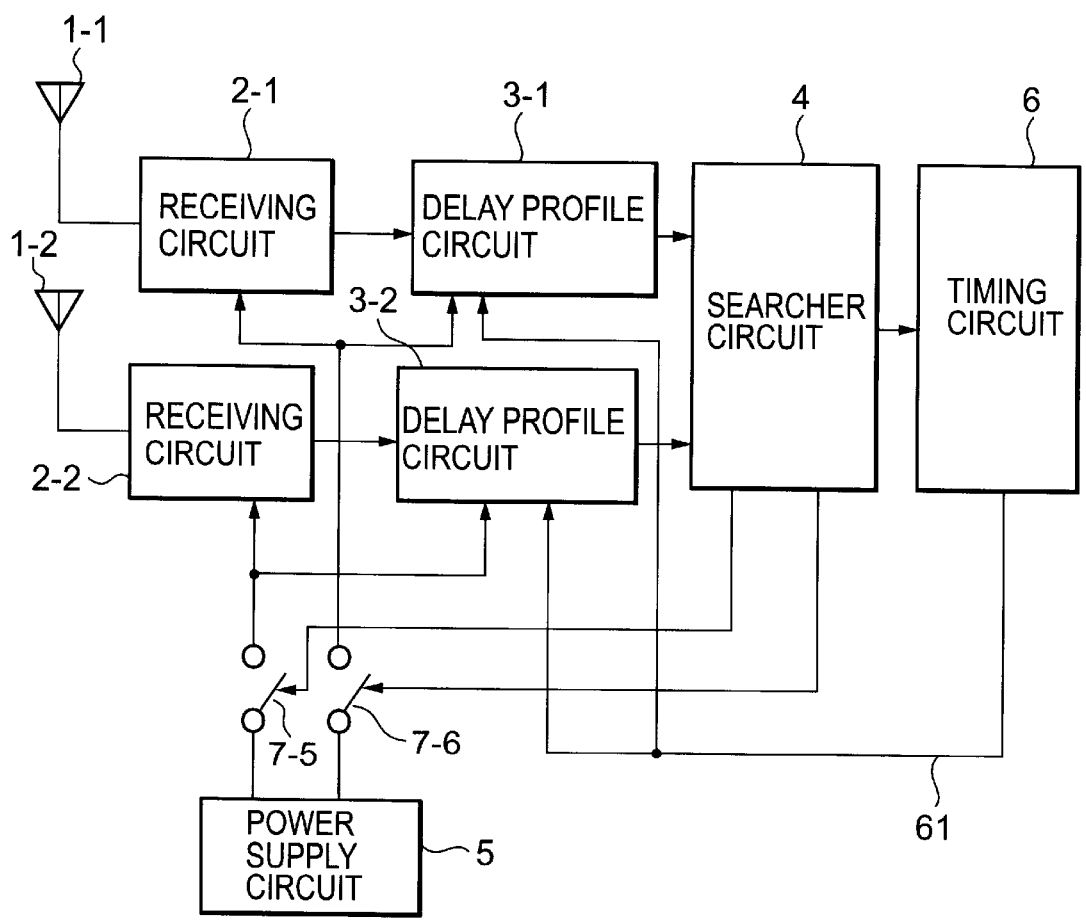
FIG. 13 is a schematic block diagram for indicating an arrangement of a wireless communication apparatus according to another embodiment of the present invention.

It should be understood that the circuit arrangements and the operations of the receiving circuits 2-1/2-2, the delayprofile circuits 3-1/3-2, the searcher circuit 4, the power supply circuit 5, and the timing circuit 6 shown in FIG. 13 are similar to those of FIG. 3, and FIG. 12.

As previously described, such switches are provided which can interrupt supplying of the electric power to the receiving circuit and the delayprofile circuit so as to substantially stop the operations of both these circuits. As a consequence, the power consumption of the above ON/OFF-control can be reduced larger than that of another ON/OFF-control by which any one of the receiving circuit and the delayprofile circuit is stopped. In this case, as shown in FIG. 13, if the switches 7-5 and 7-6 for interrupting the supply of the electric power are commonly arranged for both the receiving circuits and the delayprofile circuits, then the manufacturing cost may be reduced.

As the above-explained switches, various sorts of switching elements may be employed. For example, electrical switches such as a power MOS (metal oxide semiconductor) transistor and a well-known analog switch, and also mechanical switches such as a relay switch may be used. However, in order to deteriorate portability of this wireless communication apparatus while suppressing the circuit scale, it is preferable to employ transistors which can be readily made in an integrated circuit form.

Figure 14:
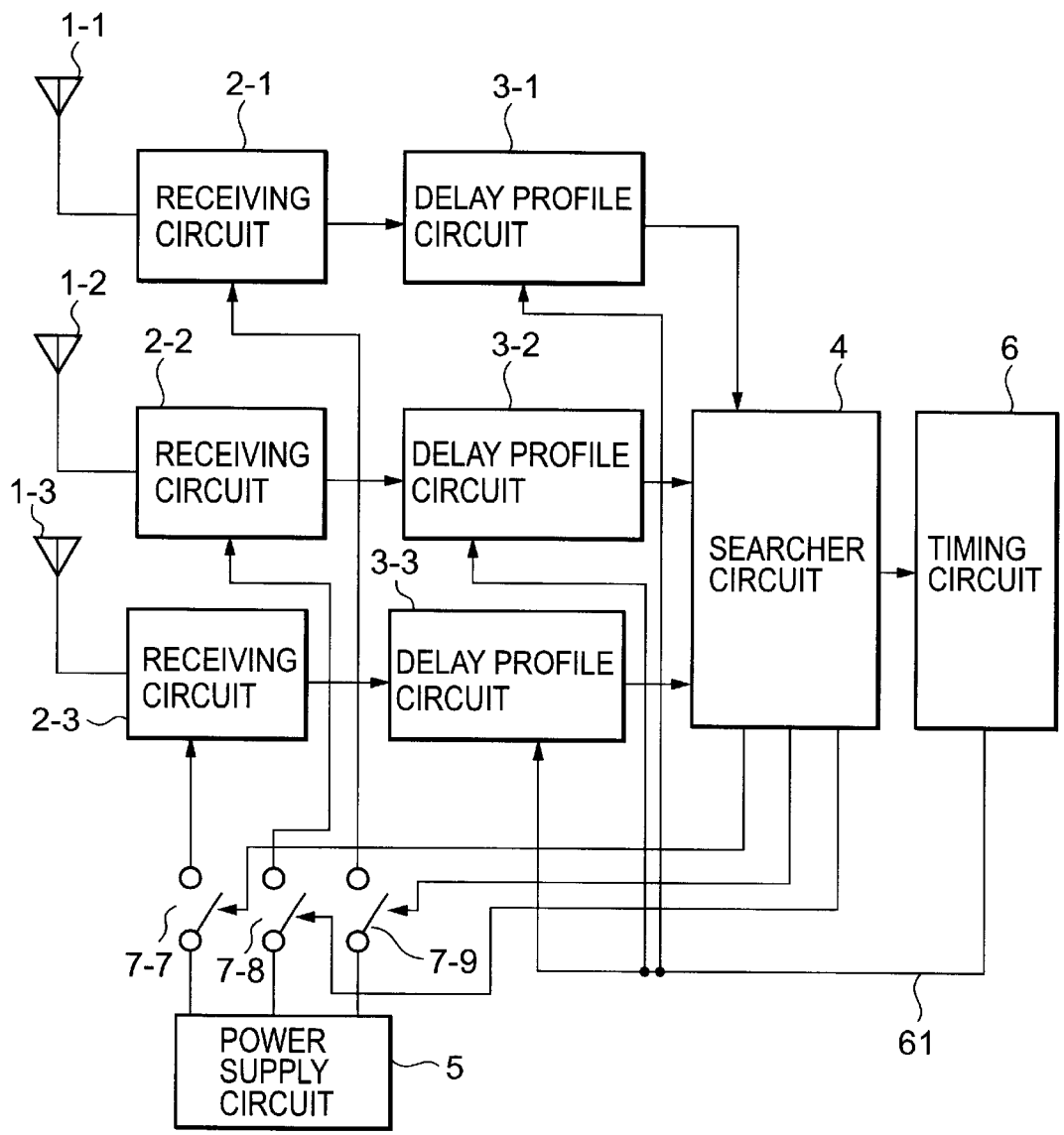
FIG. 14 is a schematic block diagram for indicating an arrangement of a wireless communication apparatus according to a further embodiment of the present invention.

As apparently, the present inventive idea may be applied to another circuit arrangement. That is, as represented in FIG. 14, three signal reception systems, or more may be employed as to the receiving circuits and the delayprofile circuits. Also in this alternative case, since the supply of the electric power to such a signal reception system in which a peak value of correlation value data, namely a correlation value is small among the plural signal systems is interrupted, the power consumption may be reduced. In the case that the receiving circuits are provided for more than three signal reception systems, only one, or two receiving circuits whose power supplying operations are interrupted may be realized. That is, there is no limitation in the number of receiving circuits which are interrupted. However, in order to avoid deterioration of the receiving sensitivity, it is preferable to supply the electric power to the plural receiving circuits whose number is equal to at least ½ total number of the receiving circuits. Also, in this case, it is preferable to sequentially interrupt supplying of the electric power to the receiving circuits having the smaller correlation values. For example, in such a case that supplying of the electric power to the receiving circuits employing in two signal reception systems is interrupted among the receiving circuits of the plural signal reception systems, it is preferable to interrupt supplying of the electric power to both a receiving circuit having the lowmost correlation value and also another receiving circuit having the second lowmost correlation value.

As previously explained, also in the wireless communication apparatus having three signal reception systems, or more, the above-explained power consumption reducing circuit arrangement and also power supply stopping circuit arrangement that the supply of the electric power to the delay profile circuits and/or the receiving circuits is stopped may be similarly applied.

It should be understood that the circuit arrangements and the operations of the receiving circuits, the delayprofile circuits, the searcher circuit, the power supply circuit, the timing circuit, and the switches shown in FIG. 14 are substantially identical to those of FIG. 3.

Referring again to FIG. 3, another embodiment of the present invention will now be explained. In FIG. 3, the searcher circuit 4 which receives information about signal levels of correlation value data outputted from the delayprofile circuits 3-1 and 3-2 detects a peak of the correlation value data within a predetermined time of period, and outputs a timing adjusting value to the timing circuit 6 in response to such timing when this peak is detected. The delayprofile circuit 3 executes the above-explained operation as shown in FIG. 4 based upon this timing adjusting value. At this time, in the CDMA wireless communication apparatus having two signal reception systems, or more, the searcher circuit 4 retrieves the correlation values for the two signal reception systems within a predetermined time of period. Thus, the searcher circuit 4 must be operated by such an operating clock having a high repetition frequency.

Therefore, in accordance with this embodiment, when the correlation value for only one signal reception system is retrieved, the repetition frequency of the operating clock for the searcher circuit 4 is lowered. In other words, in such a case that only one signal reception system is retrieved for the correlation value while substantially stopping the operations of other signal reception systems, since the processing amount is decreased, the internal operating clock may be suppressed to the low frequency. As a consequence, in this embodiment, while the repetition frequency of the operating clock of the searcher circuit 4 is lowered, the power which is consumed by the searcher circuit 4 can be suppressed to the small value.

Figure 15:
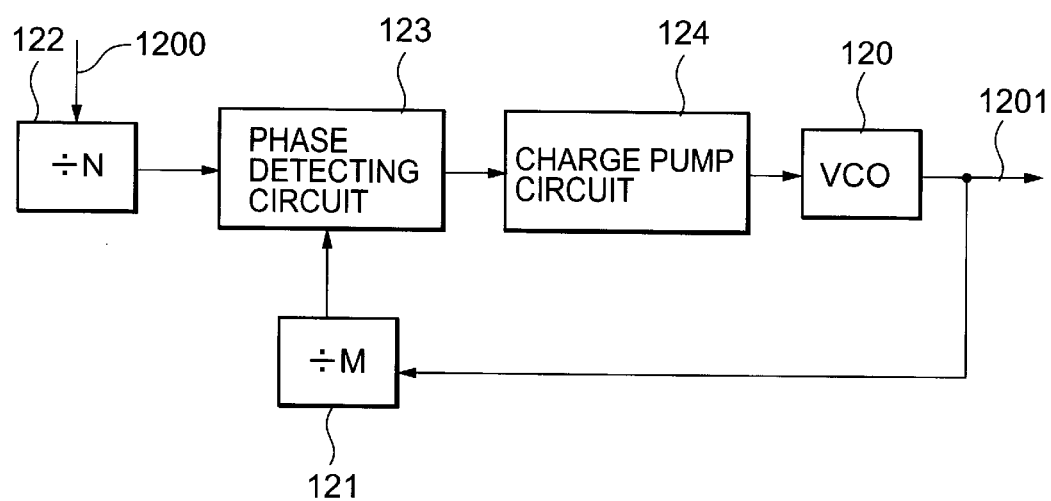
FIG. 15 is a block diagram for indicating a circuit arrangement of a PLL circuit shown in FIG. 6.

Concretely speaking, the above-explained PLL circuit for constituting the searcher circuit 4 is controlled so as to lower the operating clock. This PLL circuit employed in this searcher circuit 4 will now be described with reference to FIG. 15. As represented in FIG. 15, the PLL circuit is arranged by containing a voltage-controlled oscillator (VCO) 120, an M-frequency divider 121, an N-frequency divider 122, a phase detecting circuit 123, and a charge pump circuit 124. The M-frequency divider 121 executes M-frequency dividing operation as to the oscillation output of this VCO 120. The N-frequency divider 122 executes N-frequency dividing operation as to a reference signal to produce an output signal. The phase detecting circuit 123 detects a phase of an output signal derived from the M-frequency divider 121 with respect to the phase of the output signal derived from the N-frequency divider 122. The charge pump circuit 124 integrates this phase detection result.

Then, since the oscillating frequency of the voltage-controlled oscillator (VCO) 120 is controlled by the output signal of the charge pump circuit 124, the well-known phase synchronization loop is formed, and an oscillation output 1201 can be produced which is synchronized with the reference signal 1200. In other words, this oscillation output 1201 may constitute the above-described operating clock of the correlation value detecting circuit 41. For example, in such a case that the repetition frequency of the reference signal 1200 is selected to be 16.384 MHz, it is possible to obtain the oscillation output 1201 having the repetition frequency of 70 MHz. In response to this oscillation output 1201 having the repetition frequency of 70 MHz, the above-explained CPU 421 and other circuit elements are operated. In other words, the clock signal having the frequency of 70 MHz is produced from the PLL circuit based upon the externally entered clock signal having the frequency of 16.384 MHz, and the CPU 421 is operated in response to this clock signal having the frequency of 70 MHz.

Now, when the repetition frequency of the frequency-divided output signal from the N-frequency divider 122 is varied, the oscillating frequency of the voltage-controlled oscillator (VCO) 120 is varied. As a result, when either the repetition frequency of the reference signal 1200 is varied or the frequency dividing ratio of the N-frequency divider 122 is varied, the oscillation output 1201, namely the operating clock of the searcher circuit 4 can be lowered. For example, it is now assumed that as to the correlation value data derived from both the receiving circuits of the two signal systems, the process operation such as peak detection must be carried out in 12.7 MIPS (million instruction per second). Also, in this case, as to the correlation value data derived from the receiving circuit of only one signal system, since the process operation may be carried out in 8 MIPS, the processing amount thereof becomes only approximately ⅔ processing amount when the process operations for the two signal reception systems are carried out. As a consequence, the operating clock for the correlation value detecting circuit 41 can be lowered.

As a consequence, while such a control operation is carried out to substantially stop the operation of the receiving circuit employed in the signal reception system having the smaller correlation value, namely the lower reception level, if the operating clock of the searcher circuit 4 is lowered, then the electric power consumed by the searcher circuit 4 can also be suppressed to the low value.

Figure 16:
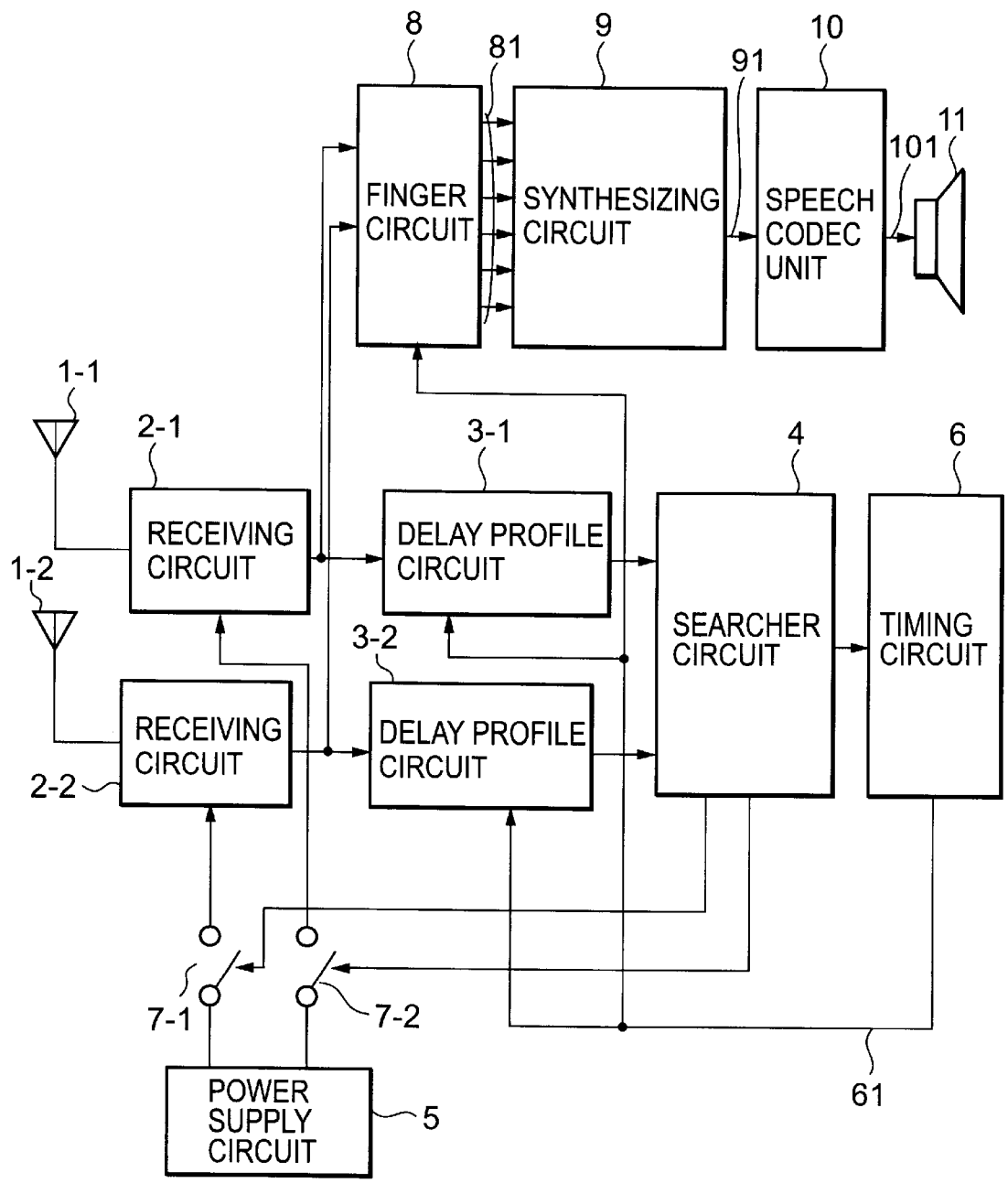
FIG. 16 is a schematic block diagram for representing an overall arrangement of a wireless communication apparatus according to the present invention.

In FIG. 16, there is shown an overall arrangement of the wireless communication apparatus containing the above-explained power consumption reducing circuit. In this drawing, the wireless communication apparatus is arranged by employing the following circuits in addition to the circuit arrangement shown in FIG. 3. That is, this wireless communication apparatus newly employs: a finger circuit 8 for inverse-spreading the reception signals obtained from the receiving circuits 2-1/2-2; a synthesizing circuit 9 for synthesizing the inverse-spread signals 81 outputted from the finger circuit 8 with each other; a speech codec (CODEC) unit 10 for decoding the synthesized signal 91 outputted from this synthesizing circuit 9 to produce a speech signal; and a speaker 11 for outputting the speech signal 101 derived from the speech codec unit 10.

In response to the timing signal 61 outputted from the timing circuit 6, the finger circuit 8 inverse-spreads the reception signal. It should be noted that both the receiving circuits 2-1 and 2-2 shown in FIG. 16 may function as the radio communication section, and the reception signals thereof are supplied to the finger circuit 8.

In this circuit arrangement of the wireless communication apparatus, the inverse-spread signals 81 are combined with each other which are produced by inverse-spreading the reception signals outputted from the receiving circuits 2-1 and 2-2, and then the combined signal is outputted as voice from the speaker 11. Then, the above-explained process operation is carried out, for example, supplying of the electric power to the receiving circuits 2-1 or 2-2 is stopped. As a consequence, the power consumption can be reduced in the wireless communication apparatus receiving signals delivered in CDMA system.

As described above, in the case that a difference between peak values of two correlation value data is smaller than a predetermined threshold value (will be referred to as a "relative threshold value" hereinafter), supplying of electric power to the receiving circuit of such a signal reception system corresponding to a smaller peak value is stopped. Alternatively, another absolute threshold value may be employed in addition to this relative threshold value. Then, such a control operation may be carried out to stop supplying of the electric power only when there is a constant relationship between the absolute threshold value and the two peak values. For example, in such a case that the difference between the two peak values is larger than the relative threshold value; the larger peak value among these peak values is larger than the absolute threshold value; and also the smaller peak value is smaller than the absolute threshold value, supplying of the electric power to the receiving circuit for the signal reception system corresponding to the smaller peak value is stopped. In this case, even when the difference between the two peak values is larger than the relative threshold value, if either both the two peak values are larger than the absolute threshold value, or smaller than the absolute threshold value, then supplying of the electric power to the receiving circuit for any one of the signal reception systems is continued.

When these two peak values are larger than the absolute threshold value, both the peak values may be used to control the timing circuit 6 and the like. Also, when these two peak values are smaller than the absolute threshold value, both the peak values may be used to control the timing circuit 6 and the like.

Only the absolute threshold value may be used for determination of execution of the power consumption reduction. For example, in such a case that the larger peak value among these peak values is larger than the absolute threshold value and the smaller peak value is smaller than the absolute threshold value, supplying of the electric power to the receiving circuit for the signal reception system corresponding to the smaller peak value is stopped.

As previously described, the present invention has a merit that when the signals are received from at least two signal reception systems, the operation is substantially stopped such that supplying of the electric power to such a receiving circuit of the signal reception system having the small correlation value is interrupted based upon the levels of the correlation values obtained from the reception signals of these signal reception systems, so that the power consumption can be reduced. Also, while operation of at least one receiving circuit is substantially stopped, the repetition frequency of the operating clock of the searcher circuit is lowered. As a result, there is another merit that the power consumption can be furthermore reduced.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A Code Division Multiple Access (CDMA) wireless communication apparatus, comprising:
   a plurality of receivers for receiving signals to output reception signals; and
   a controller for substantially stopping operation of at least one of said plural receivers based upon the reception signals received by said receivers,
   wherein each of said plurality of receivers includes a demodulator for demodulating a signal received by an antenna to output a demodulated signal and a correlator for correlating the demodulated signal with respect to a predetermined data to thereby output a correlation value, and
   wherein said controller substantially stops the operation of the reception system having a lower correlation value in such a case that a difference between the correlation values outputted from the respective reception systems exceeds a predetermined threshold value.

2. The CDMA wireless communication apparatus as claimed in claim 1, wherein said controller includes first stopping means for substantially stopping operation of said demodulator, and
   wherein said first stopping means substantially stops operation of such a receiver of said plural receivers which gives a lower correlation value based on said comparison result.

3. The CDMA wireless communication apparatus as claimed in claim 1, further comprising:
   frequency lowering means for lowering a repetition frequency of an operation clock which operates at least a part of said wireless communication apparatus when the operation of at least one of said plural receivers is substantially stopped by said controller.

4. The CDMA wireless communication apparatus as claimed in claim 1, wherein said controller includes second stopping means for substantially stopping operation of said correlator.

5. The CDMA wireless communication apparatus as claimed in claim 1, wherein said controller includes:
   a peak detector for detecting a peak of the correlation values obtained from said correlators; and
   a peak comparator for comparing the peaks of the correlation values with each other, each peak of said peaks of said correlation values being obtained from the respective correlator and being detected by said peak detector.

6. The CDMA wireless communication apparatus as claimed in claim 5, wherein said first stopping means substantially stops operation of such a receiver which outputs the correlation value with the low peak based on the comparison result made by said peak comparator.

7. The CDMA wireless communication apparatus as claimed in claim 1, wherein said controller includes:
   a comparator for comparing the correlation values with each other to obtain a comparison result, said correlation values being derived from said correlator provided in said plural receivers; and
   first stopping means for substantially stopping an operation of at least one of said plural receivers based upon said comparison result.

8. The CDMA wireless communication apparatus as claimed in claim 7, wherein said first stopping means stops a supply of electric power to said demodulator.

9. The CDMA wireless communication apparatus as claimed in claim 8, wherein said first stopping means stops a local oscillation signal input to said demodulator.

10. A power consumption reducing method of a Code Division Multiple Access (CDMA) wireless communication apparatus, comprising:
    receiving signals at a plurality of reception systems to output a plurality of reception signals; and
    substantially stopping operation of at least one of said plural reception systems based upon said plurality of reception signals,
    wherein said stopping operation substantially stops the operation of the reception system having a lower correlation value in such a case that a difference between the correlation values outputted from the respective reception systems exceeds a predetermined threshold value.

11. The power consumption reducing method as claimed in claim 10, wherein said stopping operation substantially stops operation of a delayprofile circuit provided in correspondence with the reception system whose operation is substantially stopped.

12. The power consumption reducing method as claimed in claim 10, wherein said stopping operation substantially stops operation of at least one of a delayprofile circuit and said reception system provided in correspondence with said delayprofile circuit, said delayprofile circuit providing correlation value data having a low peak.

13. A Code Division Multiple Access (CDMA) communication apparatus, comprising:
- at least two antennas;
- at least two receiving circuits provided in correspondence with said antennas, for demodulating signals received by said antennas to thereby output reception signals;
- at least two delayprofile circuits provided in correspondence with said receiving circuits, for correlating said reception signals with respect to a predetermined data to thereby output correlation value data; and
- a searcher circuit for detecting peaks from at least two correlation value data derived from said delayprofile circuits, wherein said searcher circuit includes first stopping means for comparing the peaks detected from the correlation value data with each other to obtain a comparison result, and for substantially stopping operation of at least one of said plural receiving circuits based on said comparison result,
- wherein said searcher circuit substantially stops the operation of at least one of the receiving circuits having a lower correlation value in such a case that a difference between the correlation values outputted from the respective reception systems exceeds a predetermined threshold value.

14. The CDMA communication apparatus as claimed in claim 13, wherein after said first stopping means substantially stops the operation of at least one of said plural receiving circuits, said first stopping means restarts the operation of said one receiving circuit after a predetermined period of time.

15. The CDMA communication apparatus as claimed in claim 14, wherein said predetermined period of time is set based upon a time period of a correlation process operation executed in said delayprofile circuit.

16. The CDMA communication apparatus as claimed in claim 13, further comprising:
- a timing circuit for outputting a timing signal in response to a peak detection timing by said searcher circuit.

17. The CDMA communication apparatus as claimed in claim 16, wherein said delayprofile circuit shifts a phase of said reception signal every predetermined interval, and correlates said phase-shifted signal with respect to a predetermined data to thereby output correlation value data, and also adjusts a sending timing of said correlation value data based upon the timing signal outputted from said timing circuit.

18. The CDMA communication apparatus as claimed in claim 16, further comprising:
- at least two finger circuits for respectively performing an inverse-spread process operation with respect to the reception signals outputted from said at least two receiving circuits in response to the timing signal outputted from said timing circuit to thereby output inverse-spread signals.

19. The CDMA communication apparatus as claimed in claim 18, further comprising:
- a synthesizing circuit for synthesizing the inverse-spread signals with each other, which are outputted from said at least two finger circuits.

20. A power consumption reducing method of a Code Division Multiple Access (CDMA) communication apparatus, comprising:
- demodulating signals received by at least two antennas to thereby output reception signals;
- shifting phases of said reception signals every predetermined interval and then correlating said reception signals with respect to a predetermined data to thereby output correlation value data;
- detecting peaks from at least two correlation value data;
- comparing the peaks detected from said at least two correlation value data with each other to obtain a comparison result; and
- substantially stopping processing said signal received by at least one of said antennas based on said comparison result.

21. A Code Division Multiple Access (CDMA) receiving apparatus, comprising:
- two reception systems for receiving signals, demodulating the received signals, and correlating the demodulated reception signals with respect to a predetermined data to thereby output a correlation value; and
- a control unit for substantially stopping operation of at least one of said two reception systems based upon the correlation values outputted from the respective reception systems,
- wherein said controller substantially stops the operation of the reception system having a lower correlation value in such a case that a difference between the correlation values outputted from the respective reception systems exceeds a predetermined threshold value.

22. A power consumption reducing method of a Code Division Multiple Access (CDMA) communication apparatus, comprising:
- demodulating signals received by at least two antennas to thereby output reception signals;
- shifting phases of said reception signals every predetermined interval and then correlating said reception signals with respect to a predetermined data to thereby output correlation value data;
- detecting peaks from at least two correlation value data;
- comparing the peaks detected from said at least two correlation value data with each other to obtain a comparison result; and
- substantially stopping processing said signal received by at least one of said antennas based on said comparison result,
- wherein said stopping step substantially stops the operation of at least one receiving circuit of a plurality of receiving circuits having a lower correlation value in such a case that a difference between the correlation values outputted from the respective reception systems exceeds a predetermined threshold value.

23. A Code Division Multiple Access (CDMA) receiving apparatus, comprising:
- two reception systems for receiving signals, demodulating the received signals, and correlating the demodulated reception signals with respect to a predetermined data to thereby output a correlation value; and
- a control unit for substantially stopping operation of at least one of said plural reception systems based upon the correlation values outputted from the respective reception systems,
- wherein said control unit substantially stops the operation of the reception system having a lower correlation value in such a case that a difference between the correlation values outputted from the respective reception systems exceeds a predetermined threshold value.

* * * * *